United States Patent [19]

Johnson et al.

[11] Patent Number: 4,800,405
[45] Date of Patent: Jan. 24, 1989

[54] CAMERA HAVING DISCONNECTIBLE MANUAL CONTROLS FOR FILM UNIT REMOVAL ASSEMBLY AND A SHADE ASSEMBLY

[75] Inventors: Bruce K. Johnson, Andover; George D. Whiteside, Lexington, both of Mass.

[73] Assignee: Polaroid Corporation, Cambridge, Mass.

[21] Appl. No.: 137,669

[22] Filed: Dec. 24, 1987

[51] Int. Cl.$^4$ ............................................. G03B 17/52
[52] U.S. Cl. ....................................... 354/86; 354/212
[58] Field of Search .................... 354/83, 84, 85, 86, 354/173.1, 212, 288

[56] References Cited

U.S. PATENT DOCUMENTS 2,794,377  6/1957  Fairbank .
3,537,370  11/1970  Wareham ............................. 354/86
4,265,525  5/1981  Stella et al. ........................... 354/86
4,664,497  5/1987  Johnson et al. ....................... 354/86

Primary Examiner—A. A. Mathews
Attorney, Agent, or Firm—Alfred E. Corrigan

[57] ABSTRACT

A photographic camera of the instant type having an imbibition chamber for storing exposed film units during their development. The imbibition chamber has a window through which an image in an exposed film in the chamber can be viewed. Manually operative means control the movement of a curtain or blind from a position covering the window to an uncovering position and movement of an exposed film unit to a position where it exits from the chamber via an egress door. Automatic means is provided for rendering the manually operative means ineffective to perform such functions during the exposure and development of a film unit.

14 Claims, 3 Drawing Sheets

CAMERA HAVING DISCONNECTIBLE MANUAL CONTROLS FOR FILM UNIT REMOVAL ASSEMBLY AND A SHADE ASSEMBLY

RELATED APPLICATION

This application is related to the copending application Ser. No. 137,671 filed on even date herewith by George D. Whiteside and entitled "Instant Type Camera With Manually Operable Means for Removing Film Units From Imbibition Chamber."

FIELD OF INVENTION

This invention relates to a photographic camera of the instant type having an arrangement for moving an exposed self-developing type film unit from an exposure position to a lighttight imbibition chamber where it remains during the formation of a visible image. The imbibition chamber has a film loading door with a window for viewing a film located in the chamber. This window has a blind which normally covers the window but which is movable to allow viewing of the developed film.

BACKGROUND OF THE INVENTION

An instant camera of the general type indicated above is disclosed in U.S. Pat. No. 4,664,497 to Johnson et al. This patent describes a photographic camera enclosing a film cassette supported in an exposure position. A lighttight imbibition or storage chamber is located behind or below the film cassette support into which an exposed film unit is moved and remains during the formation of a visible image.

An outer or lower wall of the chamber has a film loading door with a window therein for viewing an exposed film unit after a predetermined period while it is located in the imbibition chamber. A blind is provided in association with the window and is movable from a normal lighttight covering position over the window to an uncovering position to permit viewing of the film unit. With this arrangement, sequentially exposed film units are moved into the imbibition chamber and positioned in superposed relationship in that chamber, the last film unit being outermost or lowermost and nearest the window.

A manually operable button is provided on the lower wall to move a slide plate carrying a film unit engaging end. The film unit engaging end is configured to move all of the film units from the imbibition chamber via an egress opening to a position where the operator may grasp them and complete their removal.

With this arrangement, when an exposed film unit is moved into the imbibition or storage chamber, it may cause a previously exposed film unit already in the chamber to be moved partially out of the chamber through the egress opening due to the sliding frictional engagement between the outermost or lowermost film unit and the adjacent superposed film unit. There is no positive lock to prevent the partial ejection of a developing film unit as the newly exposed film unit is delivered to the lighttight chamber. Also, with this arrangement there is no adequate means for preventing actuation of the button to remove an exposed film unit during the desired "dark period" when it is being processed in the camera.

SUMMARY OF THE INVENTION

The present invention relates to a self-developing or instant type photographic apparatus, e.g., a camera, having a lighttight imbibition chamber in which an exposed film unit is adapted to remain until its latent image has been substantially transformed into a viewable image. The apparatus includes a housing enclosing a film chamber having structure for locating and supporting a film assemblage in position for the sequential exposure of a plurality of film units located therein. Located rearwardly or below the film assemblage supporting structure is a chamber which is adapted to receive an exposed film unit, subsequent to a processing liquid being spread across a layer thereof, and maintain it in a lighttight environment until the processing liquid has sufficiently imbibed the film unit, to cause the formation of a visible image. The apparatus includes a battery operated motor mounted adjacent one end of the film assemblage supporting structure and means for advancing an exposed film unit from the assemblage's film cassette, around the motor and then to the lighttight imbibition chamber. The aforementioned means includes a cantilevered member having a free end which is adapted to move an uppermost film unit from the film cassette; laterally spaced pairs of superposed friction wheels which are adapted to engage the lateral sides of the exposed film unit and continue its movement away from the film cassette and around the motor and toward a pair of cylindrically configured superposed rollers; the superposed rollers; and a second cantilevered member for advancing the exposed film unit into the imbibition chamber. The rollers are adapted to rupture a container of processing liquid carried on a leading end of the advancing film unit and spread its contents across a layer thereof to initiate the formation of a visible image therein by a diffusion process. As the exposed film unit leaves the bite of the rollers, its trailing end is located in a position to be engaged by the second cantilevered member for subsequent movement into the imbibition chamber.

The apparatus further includes a loading door through which a film assemblage may be located on the aforementioned supporting structure. The loading door, which comprises one of the walls of the imbibition chamber, has a window therein through which the visible image in a film unit located within the imbibition chamber may be viewed without opening the loading door. Such window is ordinarily rendered lighttight by a blind which is movable from its operative position covering the window, to an inoperative position wherein a film unit within the chamber may be viewed. The blind is maintained in the operative position until the formation of a visible image within the last exposed unit to enter the imbibition chamber has been substantially formed. This is achieved automatically by energizing a solenoid in a manner to misalign a manual blind opening link with the blind, thereby preventing any blind movement. After the formation of the visible image, a timing circuit deenergizes the solenoid to allow the link to return to its operative position wherein it may move the blind to its inoperative position.

The imbibition chamber is also provided with a light sealed opening or egress through which all of the film units located within the imbibition chamber may be moved as a unit to the exterior of the photographic apparatus. Suitable means, such as a manually actuatable slide, is provided for such purpose.

The present invention deals with a camera of the general type disclosed in the aforementioned U.S. Pat. No. 4,664,497. However, according to the present invention, the camera is provided with manually operative means for controlling movement of the curtain or blind which is associated with the viewing window of the lighttight imbibition chamber. Manual means are also provided for moving one or more film units from the chamber when desired. But, an automatic lock is provided for rendering the manually operable means ineffective to perform their normal functions during exposure and development of a film unit. Additionally, a positive bias is provided at the exit or egress from the chamber to prevent ejection of a resident developing film unit by an entering exposed film unit which is not yet developed. Thus, accidental exposure to light of the film unit not completely developed is avoided.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
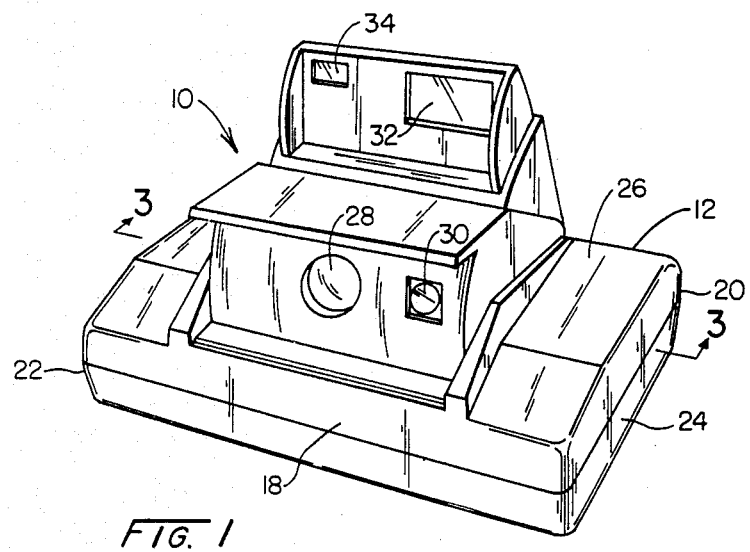
FIG. 1 is a general perspective view of a camera in which this invention is embodied.

Looking first to FIG. 1, photographic apparatus is illustrated in the form of a folding camera 10 of the instant or self-developing type. The camera illustrated is described in great detail in U.S. Pat. No. 4,664,497 and to the extent necessary for a full understanding of this invention such patent is incorporated herein by reference.

The camera includes a main housing 12 having a section 14 which is pivotally attached thereto and which forms a door in the camera for the insertion of a cassette filled with a plurality of film units which will be explained subsequently. The main housing 12 includes a bottom wall 16, a front wall 18, a rear wall 20 and end walls 22 and 24. As illustrated in FIG. 1, the folding portions of the camera are shown projecting upwardly from a top wall 26 of the housing.

The door 14 is pivotally connected to the end wall 22 of the main housing 12 by a hinge (not shown) which is generally parallel to the axis of the camera's objective lens 28 and generally perpendicular to the front and rear walls 18 and 20. Adjacent the lens 28 is a photocell window 30 and upwardly from that is an artificial illumination means such as a strobe 32 and a ranging window 34 all of which are conventional.

Figure 3:
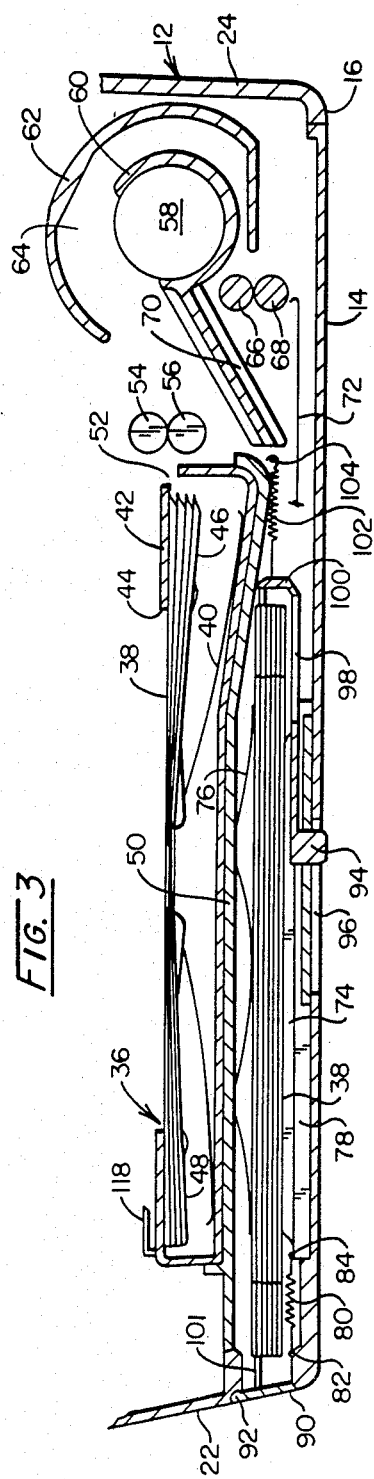
FIG. 3 is an enlarged sectional view taken generally along line 3—3 of FIG. 1 of the lower portion of the camera.

Looking now to FIG. 3, the camera 10 is adapted to receive a film assemblage of the type which includes a film cassette 36 having therein a stack of film units 38 which are resiliently biased upward by a spring 40 against a forward wall 42 of the cassette so as to locate the uppermost film unit adjacent to an exposure aperture 44 in the wall 42. The film units 38 are of the integral self-developing or instant type and include a rupturable pod 46 of processing liquid at their leading ends and a trap 48 at their trailing ends for receiving any excess processing liquid, as is well known in the art.

The camera includes a plate 50 oriented approximately parallel with the wall 16 and serves to support the film cassette 36 in position for the sequential photographic exposure of the film units 38. The plate 50 is configured to receive the cassette and locate it properly for the camera operation.

At the right-hand side of FIG. 3 is an opening 52 from which film units 38 are ejected from the cassette 36 subsequent to exposure. A pair of friction rollers 54 and 56 are illustrated but, indeed there are four such rollers so located as to have two in substantial rolling engagement to receiving the side rails of the film units 38 as they are ejected from the cassette.

A battery powered motor 58 is encompassed in a circular housing 60 and radially spaced from housing 60 is a generally circular guide ramp 62. The circular housing 60 and guide ramp 62 provide a passage 64 to be traversed by the ejected film units 38 prior to the time said unit is engaged by a pair of liquid spreading rollers 66 and 68. Said rollers 66 and 68 are slightly greater in length than the length of the pod 46 and serve to rupture the pod and spread processing liquid between layers of the exposed film unit.

Figure 2:
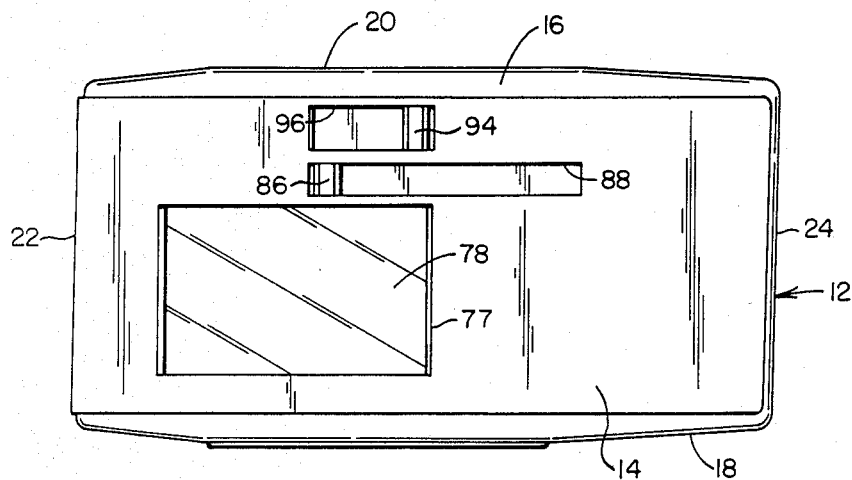
FIG. 2 is a bottom view of the camera.

Upon emerging from rollers 66 and 68 a film unit 38 will be directed by a ramp 70 onto a film advancing member 72 which is adapted to be driven in a reciprocating manner to enable its right-hand free end to engage a trailing end of the exposed film unit and move it to the left into an imbibition chamber 74. The chamber 74 is designed to be lighttight and is in fact a part of the loading door 14. While in the chamber the film units 38 are biased downward by leaf spring 76 to hold the exposed side of the film unit facing toward a viewing window 77, best seen in FIGS. 2 and 4. During the development stage of the film unit it is shielded from light through the window 77 by a curtain or blind 78. Blind 78 is normally biased to its closed position by a spring 80 attached at 82 to the door 14 and at 84 to one side of the blind. To move blind 78 requires a specific manual operation by a button 86 which is exposed through a slot 88 through bottom wall 16.

Looking to the left-hand side of FIG. 3, a closure or door 90, pivoted at 92 from end wall 22, closes an egress to seal the chamber 74 against light actinic to an exposed film unit. Door 90 may be opened by a button 94 projecting through a second slot 96 in wall 16. Note in FIG. 5 that first slot 88 and second slot 96 are arranged generally parallel. Button 94 is connected to a slide 98 having an up-raised flange 100 at one end, for engaging the trailing end 48 of a film unit, and including a probe 101 extending from said flange 100 to a position just short of said door 90 whereby the door will swing open when the button 94 is pushed from right to left as shown in FIG. 3. Door 90 is ordinarily biased to the closed position and the button 94 biased to the right-hand side of slot 96 by a second spring 102 which is attached at one end to flange 100 and at the other end to the door 14 at 104.

Figure 4:
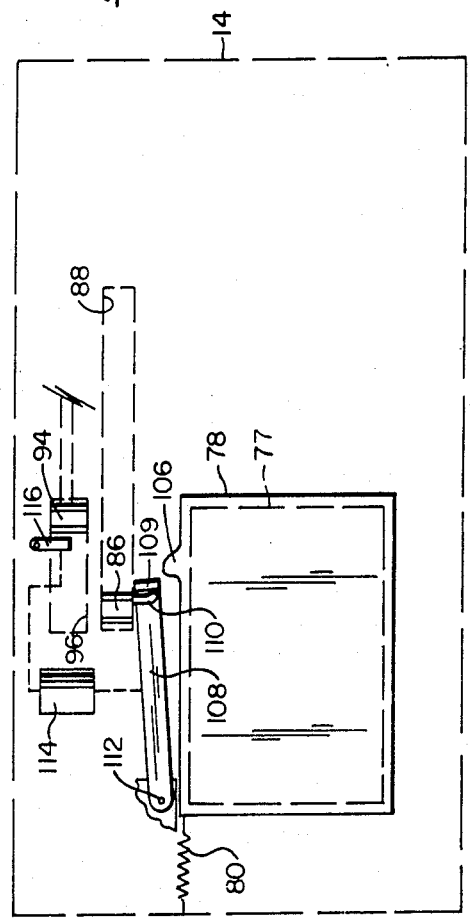
FIG. 4 is a schematic view showing a blind or curtain in covering position relative to a viewing opening for an imbibition chamber.
Figure 5:
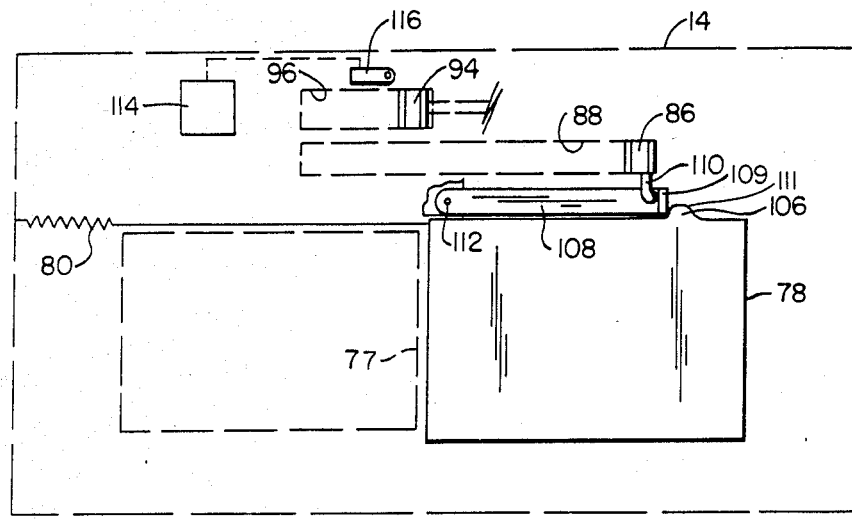
FIG. 5 is a view similar to FIG. 4 but showing the blind in uncovering relationship to the opening.

Looking to FIGS. 4 and 5, a lug 106 is shown projecting from the side of blind 78. Its purpose is to provide positive engagement for the button 86 when a film unit 38 has reached an adequate development stage in the lighttight chamber 74, e.g. thirty seconds. This positive mechanical engagement is accomplished through a pivotable link 108 and a prong 110 which extends from the button 86 into engagement with a flange 109 which extends outwardly from one end of the link 108. Link 108 is pivotally attached at 112 to a movable body and during the time the film unit is developing in the lighttight chamber 74 an automatically controlled solenoid 114 holds the link in a position such that it will not engage lug 106 even if button 86 is actuated. Thereby the blind 78 will not move from its light-blocking position over the viewing window 76. The link 108 is normally spring biased into the horizontal position shown in FIG. 5. The same solenoid is connected to a lock 116 which prevents the movement of button 94 during the film development stage.

In operation the camera will be focused and the film unit 38 exposed through opening 44. The button used to actuate the shutter of the camera is not illustrated in FIG. 1 but upon its initiation the film will be exposed and the motor 58 will be energized to drive a film advancing unit 118 in a reciprocating manner to engage the exposed film unit 38 by its trailing edge and advance it to the exterior of the cassette via opening 52. As the exposed film unit 38 emerges from the cassette 36, it enters the bite of laterally spaced pairs of motor driven friction rollers 54 and 56 which advance the film unit through the curved path 64 around the motor 58 until its leading end is located in the bite of the motor driven spread rollers 66 and 68.

The rollers 66 and 68 continue the movement of the exposed film unit while simultaneously rupturing the pod 46 of processing liquid and spreading its contents between layers of the film unit to initiate the formation of a visible image within the film unit via a diffusion transfer process. As the exposed film unit emerges from between the rollers 66 and 68, its leading end engages the underside of the ramp 70 and is deflected downwardly to film advancing member 72. After the trailing edge of film unit 38 leaves rollers 66 and 68, it is deflected downward onto the film advancing member 72. Motor 58 drives the film advancing member 72 to push the exposed film unit onto and up a pair of ramps (not shown) and into the lighttight environment of the chamber 74 for a predetermined period of time, e.g., thirty seconds, until the processing liquid has been sufficiently imbibed by layers of the film unit to form a visible image in the film unit. As stated previously, the predetermined period of time starts substantially at the time that the processing liquid is spread between layers of the exposed film unit and ends when the emerging image within the exposed film unit 38 will no longer be adversely affected by any ambient light which may enter the imbibition chamber 74 via viewing window 77 or door 90.

The viewing window 77 has dimensions which are generally the same as those of the image area of the exposed film unit 38. It is generally covered in lighttight relation by the opaque blind 78 thereby maintaining the lighttightness of the imbibition chamber 74. The blind 78 is prevented from movement by spring 80 and the detent (not shown) and the automatic pivoting of link 108 by the solenoid 114. Similarly the button 94 and its associated slide 98 are prevented from movement to open door 90 by virtue of lock 116.

After the predetermined period of time, the solenoid 114 is deenergized thus allowing a spring (not shown) to return the lock 116 to its inoperative position shown in FIG. 5 and will allow the link 108 to return to its operative position which will allow the flange 109 to engage lug 106 and move the blind 78 out of the line of sight between the window 77 and the now developed visible image in the film unit 38 (see FIG. 5). After the camera operator has viewed the developed film unit 38, he will know whether he wishes to take another photograph similar to the one he had just viewed or whether he wishes to pass onto another subject. Instead, the operator has the option to eject the developed film unit from the camera through door 90, if that is desirable, by moving the button 94 to the left, as viewed in FIG. 5.

If the operator should inadvertently leave the blind or shade 78 in the open position, as shown in FIG. 5, and initiates another exposure cycle, the solenoid 114 will be energized thus pivoting the link 108 in a counterclockwise direction until flange 109 is out of contact with the lug or tab 106. Thus, the spring 80 now returns the shade 78 to its operative light blocking position shown in FIG. 4. Now, if the operator wants to view the last exposed film unit, he must return the button 86 to the left end on the slot 88. During such movement, the flange 109 will be cammed upwardly and over a sloping cam surface 111 of the tab 106 and then return to a position on the left side of the tab 106.

Figure 6:
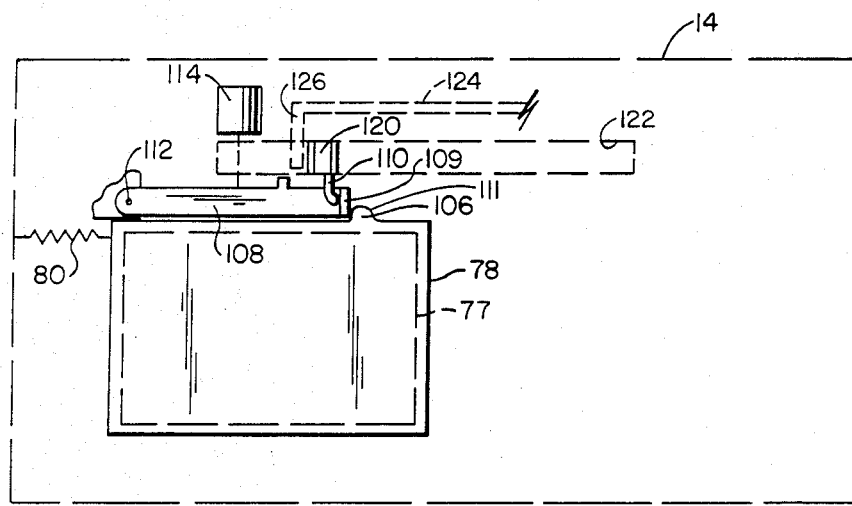
FIG. 6 is a view similar to FIG. 4 but showing a modification of the blind control.

Looking now to FIG. 6, an alternative embodiment shows a single button 120 in a slot 122 which serves to move the pivotal link 108 and the blind 78 in one direction (to the right) and then after the film unit has been viewed through window 77, the button 120 will be urged in the opposite direction to close the blind and if desired, urged even further to the left (as shown in FIG. 6) to engage a member 124 having an inwardly turned end 126 to therefore eject the film unit from the camera by the same leftward stroke. A spring (not shown) is attached to the member 124 for returning it to the position shown in FIG. 6.

Since certain changes may be made in the above-described apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising: means for supporting a film cassette containing a plurality of film units of the instant type in position for their sequential exposure;

means for defining a lighttight imbibition chamber, said means including a window through which an image in an exposed film unit may be viewed subsequent to its formation;

means for advancing a film unit, subsequent to its exposure, from the film cassette to said imbibition chamber, said advancing means including means for spreading a processing liquid across a layer of the exposed film unit so as to initiate the formation of a visible image therein;

means for defining an egress through which the exposed film units may be advanced from said imbibition chamber to the exterior of said apparatus;

means for preventing the entry of light, actinic to an exposed film unit, into said imbibition chamber via said window, said light preventing means being movable from an operable light blocking position to an inoperative position in which a film unit containing a visible image may be viewed through said window;

manually operative means for moving said light preventing means from said operative position to said inoperative position and for moving an exposed film unit from said imbibition chamber to the exterior of said camera via said egress; and means for rendering said manually operative means ineffective to perform such functions for a predetermined period of time subsequent to the exposure and during development of a film unit in the apparatus.

2. Apparatus as defined in claim 1 wherein said predetermined period of time is at least as long as the period of time between the spreading of the processing liquid across the layer of the film unit and the point in time when the developing image is longer adversely affected by light entering said imbibition chamber via said window and said egress.

3. Apparatus according to claim 2 including means for resiliently biasing said light preventing means toward said operative position.

4. Apparatus according to claim 3 including closure means for normally preventing the entrance of light into said imbibition chamber via said egress, and means for biasing said closure means into a normally closed position.

5. Apparatus as defined in claim 4 wherein said manually operative means includes first means for moving said light preventing means and second means for moving the exposed film unit from said imbibition chamber.

6. Apparatus according to claim 5 wherein said closure means is resiliently urged into a closed position so as to block the entrance of light into said imbibition chamber through said egress, and said light preventing means comprising a blind movable from a closed window-covering position to an open window-uncovering position.

7. Apparatus according to claim 6 in which a slideable member is located in said imbibition chamber for engagement with a trailing end of the exposed film units, said member having means engageable with said door for opening the latter during movement of said member toward said door; and a spring connected to said member to bias said member in a direction away from said door.

8. Apparatus according to claim 7 in which said second means is connectable to said member for moving it against the resistance of said spring and said first means is connected to said blind for moving it manually against its biasing means.

9. Apparatus as defined in claim 5 in which said manually operative means is mounted for movement in a first direction to move said light preventing means to said inoperative position, and in a second direction for moving an exposed film unit from said imbibition chamber to the exterior of said apparatus while simultaneously moving said closure means to an open position.

10. Apparatus according to claim 7 wherein said window is formed in a loading door of said apparatus.

11. Apparatus according to claim 10 in which said member is reciprocably mounted for movement relative to said egress door to open it against the resistance of said biasing means connected thereto.

12. Photographic apparatus comprising:

means for supporting a film cassette containing a plurality of film units of the instant type in position for their sequential exposure;

means for defining a lighttight imbibition chamber, said means including a loading door having a window through which an image in an exposed film unit may be viewed subsequent to its formation;

means for advancing a film unit, subsequent to its exposure, from the film cassette to said imbibition chamber, said advancing means including means for spreading a processing liquid across a layer of the exposed film unit so as to initiate the formation of a visible image therein;

means for preventing the entry of light, actinic to an exposed film unit, into said imbibition chamber via said window, said light preventing means being movable from an operable light blocking position to an inoperative position in which a film unit containing a visible image may be viewed through said window;

manually operative means for moving said light preventing means from said operative position to said inoperative position; and means for rendering said manually operative means ineffective to move said light preventing means to said inoperative position for a predetermined period of time subsequent to the exposure and during development of a film unit in the apparatus.

13. Apparatus as defined in claim 12 wherein said predetermined period of time is at least as long as the period of time between the spreading of the processing liquid across the layer of the film unit and the point in time when the developing image is longer adversely affected by light entering said imbibition chamber via said window.

14. Apparatus according to claim 13 including means for resiliently biasing said light preventing means toward said operative position.

* * * * *